INVENTOR
DAVID GLASER
WILLIAM I. deVERSTERRE
BY Robert C. Green
ATTORNEY

SIGNAL CONVERTERS

Original Filed March 13, 1958 4 Sheets-Sheet 2

INVENTOR.
DAVID GLASER
WILLIAM I. de VERSTERRE
BY Robert A. Green
ATTORNEY.

INVENTOR.
DAVID GLASER
WILLIAM I. de VERSTERRE
BY Robert A. Green
ATTORNEY.

INVENTOR.
DAVID GLASER
WILLIAM I. de VERSTERRE
BY Robert A. Green
ATTORNEY.

United States Patent Office 3,140,480

Patented July 7, 1964

3,140,480

SIGNAL CONVERTERS

David Glaser, Greenbrook, and William I. de Versterre, Bound Brook, N.J., assignors to Burroughs Corporation, Detroit, Mich., a corporation of Michigan Continuation of application Ser. No. 721,191, Mar. 13, 1958. This application July 12, 1961, Ser. No. 127,077

15 Claims. (Cl. 340—347)

This invention relates to improved electronic circuits and systems for converting electrical signals in one code system to another code system and, particularly, for decoding and translating binary-coded signals into other code systems.

This application is a continuation of application Serial No. 721,191 filed March 13, 1958, now abandoned.

For purposes of economy and simplicity, it is customary to employ a binary system of operation for electronic counters or computers. The output of such a system is, of course, in the binary code, and it is desirable to be able to convert this type of output to a more readily useful system, for example, the octal or decimal system. Electronic systems are known for converting binary-coded signals to the decimal system or to some other system. However, such electronic systems generally employ a diode matrix or other multi-element matrix, an arrangement which is undesirable because of its complexity and costliness. Other decoding systems employ mechanical apparatus which include switches, relays, and the like, and are generally undesirable because of their comparatively low speed of operation. Probably the most important shortcoming of prior art conversion systems is that they cannot readily store a signal which results from the conversion operation.

Accordingly, one object of the invention is to provide improved electronic circuits and systems for translating electrical signals from one code system to another code system.

Another object of the invention is to provide an electronic circuit and system for converting signals in the binary system to the decimal system and to other systems.

Still another object of the invention is to provide an improved electronic signal conversion circuit and system which is capable of storing signals which result from the conversion operation, the circuit being comparatively simple, reliable, and inexpensive.

The present invention is particularly suited for translating binary-coded signals to signals in other code systems and, in brief, comprises a circuit and system which employs a multi-position electron beam device in which an electron beam may be formed and switched from position to position, from each of which an output signal may be derived. In general, the number of positions employed, at which an electron beam may be formed, determines the system into which the binary-coded signal is converted. For example, if the conversion is to a decimal system, ten positions are employed and if the conversion is to an octal system, eight positions are employed. A plurality of signal input means, each adapted to carry one element or "bit" of a binary-coded signal or number, are coupled to the multi-position electron beam device and are adapted to apply the bits thereto. According to the invention, the bits may be applied to the multi-position device either serially or simultaneously. The bits of the binary number are adapted to be combined in different ways to represent different binary numbers and, for any particular combination of bits, current flow is directed to only one of the current-receiving positions where it may be stored. This one current-receiving position also provides an output signal which represents the desired decimal or other equivalent number of a binary number. Specifically, the combination of bits of the binary number serves to switch the electron beam in the current flow device from a zero position through successive positions, determined by the combination, to the selected position, the output signal from which represents the decimal or other equivalent number of the binary number. If the beam device is in the clear condition, that is, if no electron beam is present, the beam may form directly in the position determined by the bits of the binary number.

The current flow which results from the conversion operation of the beam device may be maintained or stored for as long as desired in the selected position of the multi-position device and may utlimately be employed in many different types of utilization devices and circuits. For example, the various positions in the beam device may be coupled to a visual indicating tube or the like so that the decimal number or other equivalent of the binary-coded number may be read directly.

The invention is described in greater detail by reference to the drawings wherein.

Figure 1:
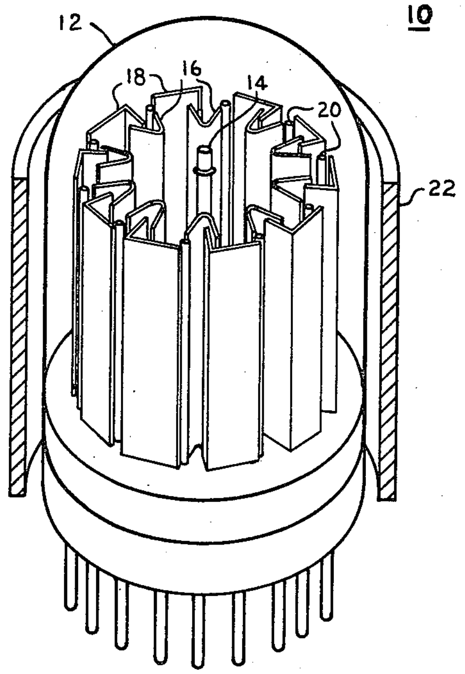
FIG. 1 is a perspective view of an electron beam tube of a type useful in practicing the invention.

The circuits and systems described below are particularly suitable for use with a multi-position electron beam tube of the type shown in U.S. Patent No. 2,721,955 to Fan et al. This type of tube is shown in FIG. 1 as tube 10 and includes, briefly, an envelope 12 which contains a central longitudinally elongated cathode 14 and ten groups of electrodes spaced radially equidistantly from the cathode and surrounding the cathode. Each group of electrodes includes a generally U-shaped elongated spade electrode 16 and a generally L-shaped target electrode 18 positioned so that each target occupies the space between adjacent spade electrodes. Each spade electrode serves to form and hold an electron beam on its corresponding target electrode. A generally rod-like switching electrode 20 is also included in each group of electrodes and is positioned between one edge of each target electrode and the adjacent spade electrode. The switching electrodes are known as switching grids. An open-ended cylindrical permanent magnet 22 is provided surrounding the tube envelope and coaxial therewith. The magnet provides an axial magnetic field which is utilized in conjunction with electric fields within the tube to form and switch an electron beam from the cathode to each of the groups of electrodes. The direction in which the beam switches, that is, clockwise or counterclockwise, is always the same and is determined by the orientation of the electric and magnetic fields.

Briefly, in operation of tube 10, electrons emitted by the cathode are retained at the cathode if each of the spades, targets and switching grids carries its normal operating electrical potential. When a spade or switching grid experiences a suitable lowering of its potential, an electron beam is formed and directed to the corresponding target electrode. The electron beam may be switched from one target electrode to the next by thus suitably altering the electrical potentials of a spade or switching grid. Under normal operating conditions, whenever electrode voltages are such that a beam might be supported at several positions, the beam will switch to the most leading position and lock in at this position.

Figure 2:
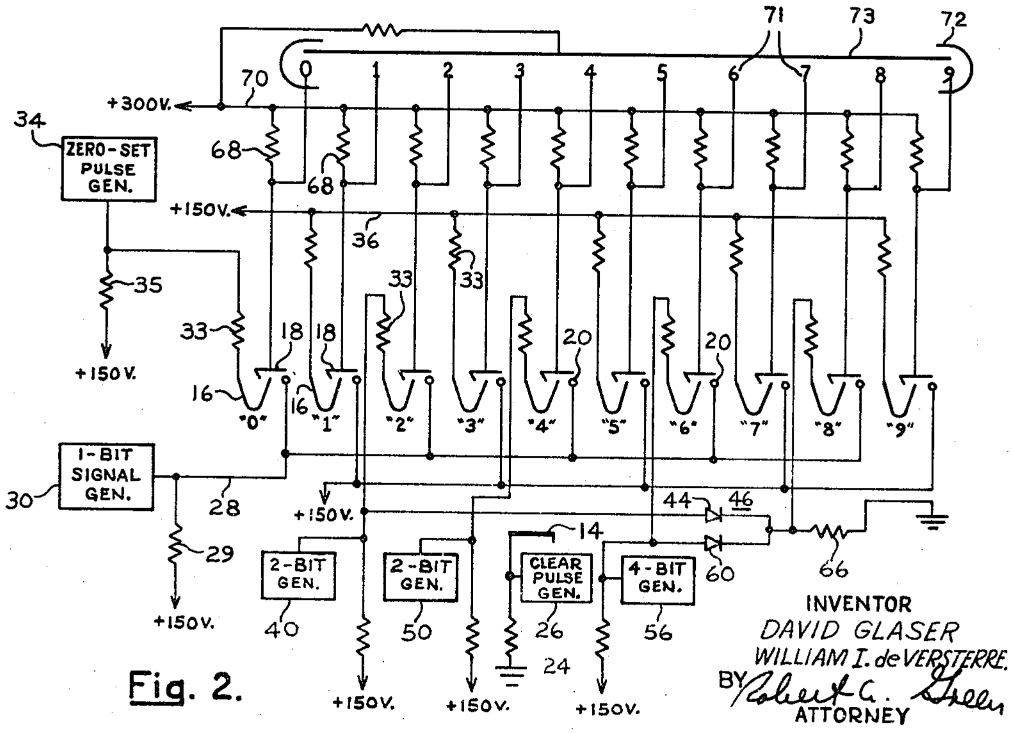
FIG. 2 is a schematic representation of the tube of FIG. 1 and a circuit in which it may be operated.

Referring to FIG. 2, the tube 10 is shown schematically in linear form in a circuit for converting a 4–2–2–1 binary-coded decimal signal to a signal in the decimal system. The groups of electrodes of the tube 10 are numbered "0" to "9" as shown and represent positions at which an electron beam may be formed and from which an output signal may be derived. In the circuit, the cathode 14 is connected to ground through a suitable resistor 24. The cathode is also connected to a source 26 of positive beam-clearing pulses of about 150 volts which serve to reduce the potential difference between the cathode and the spades 16 so that an electron beam cannot be maintained at any one of the tube positions at which it might be formed.

The switching grids 20 are connected as follows. The grids at the even-numbered positions are connected to a common lead 28 which is coupled both to a positive D.C. power supply of about 150 volts through a suitable resistor 29 and to a pulse generator 30 which provides the 1-bit of the 4–2–2–1 binary-coded signal. The 1-bit pulses are negative pulses of about 150 volts. The switching grids at the odd-numbered positions are connected together and to a positive power supply of the order of 150 volts.

The spade electrodes 16 are connected in the circuit as follows. Each spade has a spade load resistor 33. The "0" spade, that is, the spade at the "0" position, is coupled through its load resistor 33 to a zero-set pulse generator 34 which operates in conjunction with the clear pulse generator 26 to clear the tube 10 and to form an electron beam at the "0" position. The "0" spade load resistor 33 is also connected through a suitable resistor 35 to a positive D.C. power supply of about 150 volts. The spades at the odd-numbered positions are connected through their load resistors 33 to a common spade bus 36 which is coupled, in turn, to a positive D.C. power supply of about 150 volts. Each of the remaining even-numbered spade electrodes is connected as follows. The "2" spade is connected through its load resistor 33 to both a positive D.C. power supply of about 150 volts and to a pulse generator 40 which provides the first 2-bit or element of the binary-coded signal. The first 2-bit pulses are negative pulses of about 150 volts. The "2" spade is also connected to the anode of a diode 44 which comprises one element of a two-part AND gate or signal coincidence circuit 46. The "4" spade is connected through its load resistor 33 to both a positive D.C. voltage supply of about 150 volts and to a signal generator 50 which provides the second 2-bit of the binary-coded signal. The second 2-bit pulses are negative pulses of about 150 volts. The "6" spade is connected through its load resistor 33 to both a positive D.C. power supply of about 150 volts and to a pulse generator 56 which provides the 4-bit of the binary-coded signal. The 4-bit pulses are negative pulses of about 150 volts. The "6" spade is also connected to the anode of a diode 60 which comprises the second element of the AND gate 46. The cathodes of the two diodes of the AND gate are connected together to a lead 62 which is connected both through a spade load resistor 33 to the "8" spade and through a suitable load resistor 66 to ground.

The target electrodes 18 are connected in the following manner in FIG. 2. The targets are connected through suitable load resistors 68 to a common target bus 70 which is coupled to a positive D.C. power supply of about 300 volts. In addition, each target is connected to one of the cathode numerals 71 of an indicator glow tube such as the type 6844 gas tube 72 to provide a visible indication of the decimal equivalent output signal from the tube 10. The anode 73 of the tube 72 is coupled to a suitable supply voltage. The target electrodes 18 of the tube 10 may also be connected to any other suitable type of utilization device or circuit such as a printing mechanism or the like.

Briefly, in operation of the circuit of FIG. 2, a group of signal bits which represent a decimal number in binary code is applied to the various appropriate electrodes of the tube 10. The particular combination of bits determines the position at which an electron beam forms in the tube, and the output signal from this position represents the original decimal number which had been embodied in the binary bits. This decimal number is read directly from the proper glowing cathode in the indicating tube 72.

The various specific conversion operations which may be carried out with the circuit shown in FIG. 2 are as follows. Preferably, before each conversion operation, the tube 10 is first cleared and the electron beam is reset to zero and then the bits of a binary-coded number are applied to the tube. In this way, the electron beam always switches from the "0" position to a position determined by the bits of the binary signal. However, if desired, the tube may be cleared and the conversion operation may be performed by forming the beam directly at the selected position without first setting the beam to zero. A decimal zero in binary code is represented by the absence of the 4–2–2–1 bit pulses. With no bits applied to the tube electrodes, all of the spade electrodes 16 are connected to their 150 volt supply voltages, and the clear and zero-set circuits are operated in that sequence to cause an electron beam to form at the "0" position in the tube 10. Current output from the target at the "0" position to the zero numeral cathode of the indicator tube 72 causes the zero cathode to glow and thus represent the decimal zero.

A decimal one in binary code is represented by the 1-bit and, in order to convert a signal representing a binary-coded decimal one to a signal representing the decimal one directly, a pulse from the generator 30, which represents the 1-bit signal, is applied to the even-numbered switching grids 20. This pulse 23, in effect, grounds the even-numbered grids and causes the electron beam to switch one position from the "0" position to the "1" position. When this occurs, current flows from the target at the "1" position in the tube 10 to the number one indicator cathode of the indicator tube 72 which is thereby caused to glow. The decimal two is represented in binary code by the first 2-bit, and the desired translation is achieved by the application of the first 2-bit from the generator 40 to the "2" spade. The "2" spade is thus lowered in potential and the electron beam is caused to switch from the "0" target to the "2" target. Thus, the number two in the indicator tube is caused to glow and the decimal two representation is achieved.

The decimal number three is represented in the binary code by the combination of the 1-bit and the first 2-bit and the desired translation is achieved by the application of the 1-bit and 2-bit pulses from the generators 30 and 40 to the even-numbered switching electrodes and to the "2" spade, respectively. This combination of pulses causes an electron beam to form first on the "2" target and then, since the "2" switching electrode is suitably lowered in potential, the beam is quickly switched to the "3" position and the "3" target. The numeral three cathode in the tube 72 is thus caused to glow. The decimal four is represented in binary code by the second 2-bit, and the conversion is achieved by the application of the second 2-bit pulse from the generator 50 to the "4" spade which is lowered in potential sufficiently so that an electron beam switches from the "0" target to the "4" target. The cathode number four is thus caused to glow. The decimal five is represented in binary code by the combination of the 1-bit and the second 2-bit, and the conversion is effected by the application of 1-bit and 2-bit pulses from the generators 30 and 50 to the even-numbered switching electrodes and to the "4" spade, respectively. These pulses cause the electron beam to form on target "4" and then switch quickly to target "5." The cathode number five is thus caused to glow. Similarly, the decimal six is represented by the combination of the second 2-bit and 4-bit pulses from the generators 50 and 56, and the conversion operation is effected by the application of these pulses to the "4" and "6" spades, respectively. This operation causes the electron beam to switch to the "6" target and to cause the cathode six to glow.

A decimal seven is represented in binary code by the combination of the second 2-bit, 4-bit, and 1-bit pulses from the generators 50, 56, and 30, respectively, and the desired conversion is carried out by the application of these pulses to the "4" and "6" spades and the even-numbered switching grids, respectively. This operation switches a beam rapidly to the "4," "6," and "7" positions in order, and the beam remains on the "7" target and causes the cathode seven in tube 72 to glow. The decimal eight is represented in binary code by the combination of the two 2-bit pulses and the 4-bit pulse from the generators 40, 50, and 56, respectively. The conversion operation is performed by the application of these pulses to the "2," "4," and "6" spades, respectively. This arrangement causes a beam to form on the "2" target, switch quickly to the "4" target, and then, by operation of the AND gate, to switch four more positions to the "8" target. The cathode number eight in the tube 72 is thus caused to glow. The decimal nine is represented in binary code by the combination of the two 2-bit, 4-bit, and 1-bit pulses from the generators 40, 50, 56, and 30. The conversion operation is effected by applying these pulses to the "2," "4," and "6" spades and the even-numbered grids, respectively. The beam is switched to the "8" position as described above with respect to the decimal eight conversion, and then the even-numbered grids switch the beam to the "9" position and "9" target. The cathode number nine is thus caused to glow.

In operation of the system shown in FIG. 2, the various pulses which represent bits of the binary-coded signal may be applied to their respective control electrodes in the tube 10 all at the same time or in any desired order so long as the normal tendency for the electron beam to switch to a leading position is satisfied. In addition, when more than two pulses are applied to the tube at the same time, it may be desirable to provide that the pulse which affects the most leading position be applied for a somewhat longer time than the other pulses to insure that the electron beam reach the desired most leading position and stop there. Since the 4-bit and 1-bit pulses control the switching of the beam to the most leading position in any combination of pulses, it is desirable that these pulses have a longer time duration than the 2-bit pulses. Thus, for example, the 2-bit pulses may have a time duration in the range of 1 to 20 microseconds, and the 1-bit and 4-bit pulses may have a time duration in the range of 20 to 50 microseconds. Circuits for providing the various pulses required in the system of FIG. 2 are well known, and any such suitable circuit may be employed. Several preferred pulse generating circuits are illustrated in a complete system for carrying out the invention which is described next.

Figure 3:
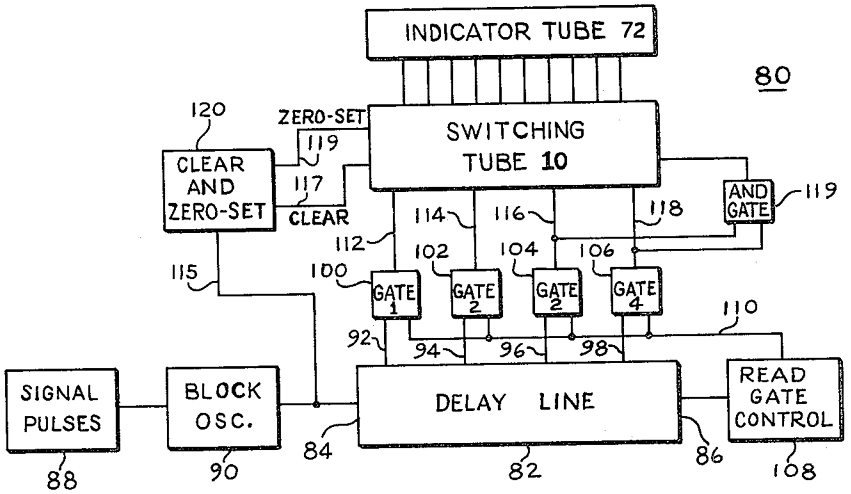
FIG. 3 is a schematic representation of a complete system embodying the circuit of FIG. 2.

A complete system 80 for automatically performing the operations described with respect to FIG. 2 is shown in block diagram in FIG. 3. The system shown in FIG. 3 includes switching tube 10 and the indicator tube 72, and the transmission of binary bits to tube 10 is controlled by a conventional delay line 82 having an input end 84 and an output end 86. A source 88 of the selected binary-coded signals is coupled to the input portion of the delay line through a blocking oscillator 90 which is adapted to transmit the 4–2–2–1 elements of the signal to the delay line in that order. The blocking oscillator may also transmit synchronizing or timing pulses into the delay line for a purpose to be described below. A plurality of output taps (not shown) are provided along the delay line corresponding in number to the maximum possible number of bits in the binary-coded signal. Output leads 92, 94, 96, 98 are coupled one to each tap and extend from the taps to read gate circuits 100, 102, 104, 106, respectively. Each read gate controls the transmission of one bit of the binary signal; gate 100 controls the 1-bit signal generator; gate 102 the first 2-bit signal generator; gate 104 the second 2-bit signal generator; and gate 106 the 4-bit signal generator.

The output of the delay line is coupled to a read gate control circuit 108 which is coupled, in turn, to the read gates by a lead 110 and is thus adapted to open all of the gates at the same time. The gate 100 transmits the 1-bit pulse and is coupled by a lead 112 to the even-numbered switching electrodes of the tube 10; the gate 102 transmits the first 2-bit pulse and is coupled by a lead 114 to the "2" spade; the gate 104 transmits the second 2-bit pulse and is coupled by a lead 116 to the "4" spade; and the gate 106 transmits the 4-bit pulse and is coupled by a lead 118 to the "6" spade. The leads 116 and 118 are coupled through the AND gate 119 to the "8" spade. The output of the blocking oscillator 90 is also coupled to a clear and zero-set pulse generator 120 by a lead 115, and the generator 120 is coupled to the cathode of the switching tube 10 by a lead 117 and to the "0" spade of the tube 10 by a lead 119. The generator 120 is adapted to provide both clear and zero-set pulses in a manner to be described.

In operation of the system of FIG. 3, in a typical operating cycle, after a conversion operation has been performed by the tube 10, a timing pulse transmitted from the oscillator 90 triggers the clear and zero-set generator which clears the tube 10 and resets a beam at the "0" position. The same output timing pulse from the blocking oscillator enters the input end 84 of the delay line 82 and passes down the line toward the output end 86. Following this timing pulse, pulses representing the bits of the binary-coded signal enter the delay line in 4–2–2–1 order. These pulses are spaced apart by an amount equal to the spacing between the taps on the delay line. At the same time that the timing pulse reaches the read gate control circuit 108, all bits of the binary-coded signal which have been transmitted into the delay line 82 are at their respective taps on the delay line. When the read gate control circuit 108 is triggered, it transmits a read pulse which opens all of the gates 100, 102, 104, and 106 at the same time, and the bits of the binary signal are applied to the tube 10 as described above. If no binary bits are present, then the output from the tube 10 represents decimal zero; if a binary signal is present, its application to the tube 10 switches the electron beam to a single unique position so quickly that only a single visible indication appears in the indicator tube to represent the decimal equivalent of the binary-coded number.

There are many circuits which may be employed to perform the functions of the read gates, read gate control circuit, and the clear and zero-set generator shown in FIG. 3. The read gates 100, 102, 104, and 106 are substantially identical and may utilize thyratrons, diodes, transistors, vacuum tubes, or the like. A preferred thyratron gate circuit is shown schematically in FIG. 4. This circuit employs a thyratron tube 122 which includes a cathode 124, a control grid 126, a shield grid 128, and an anode 130. The cathode 124 is connected directly to a source of reference potential such as ground. The anode is connected through a quenching resistor 132 to a positive D.C. supply voltage of about 300 volts. An output lead 134 from the anode is coupled to the appropriate electrode of the beam tube 10, to which the binary signal bit is to be transmitted. The anode is also connected through a series resistor 136 and capacitor 138 to ground, and the junction point 140 of the resistor 136 and capacitor 138 is clamped through a diode 142 to a positive D.C. reference potential of 150 volts. The control grid of the thyratron is connected to the appropriate tap on the delay line, and the shield grid is coupled through a parallel network including resistor 144 and capacitor 146 to the output of the read gate control circuit 108.

Figure 4:
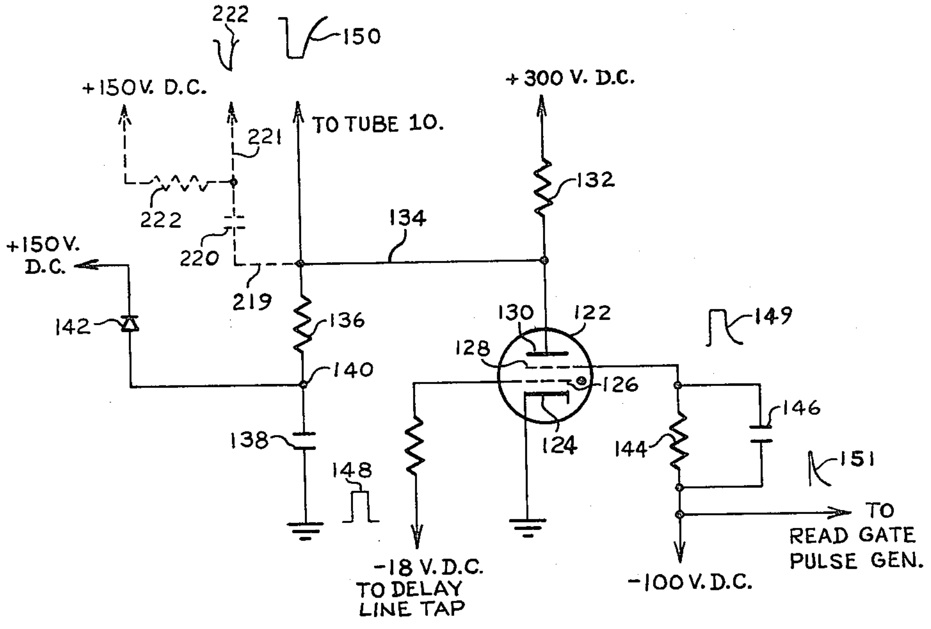
FIG. 4 is a schematic representation of a circuit comprising a portion of the system of FIG. 3.

In operation of the read gate shown in FIG. 4, the control grid 126 is normally biased at about −18 volts D.C., for example, through its connection to the appropriate tap on the delay line, and the shield grid 128 is biased at about −100 volts D.C. When a binary bit, in this case in the form of a positive pulse 148, is present at the control grid 126 through its connection to the delay line and a positive read pulse 149 is applied to the shield grid of the thyratron from the read gate control circuit 108, the thyratron 122 fires, and a negative output pulse 150 of about 150 volts appears on the output lead 134, and is applied to the selected spade or switching electrodes of the tube 10. With reference to the output pulse 150, the maximum amplitude lasts for about 50 microseconds, and the total time duration of the pulse is about 500 microseconds. The binary bit pulse 148 and the positive read gate control pulse 149 have maximum amplitudes of about 150 volts and time durations of about 50 microseconds. The actual output pulse of the read gate generator 108 as shown at 151 is a sharply peaked pulse. However, this pulse is broadened to the form of pulse 149 by the parallel network of resistor 144 and capacitor 146 network and by capacitive current and leakage current from the thyratron gate tube 122.

Figure 5:
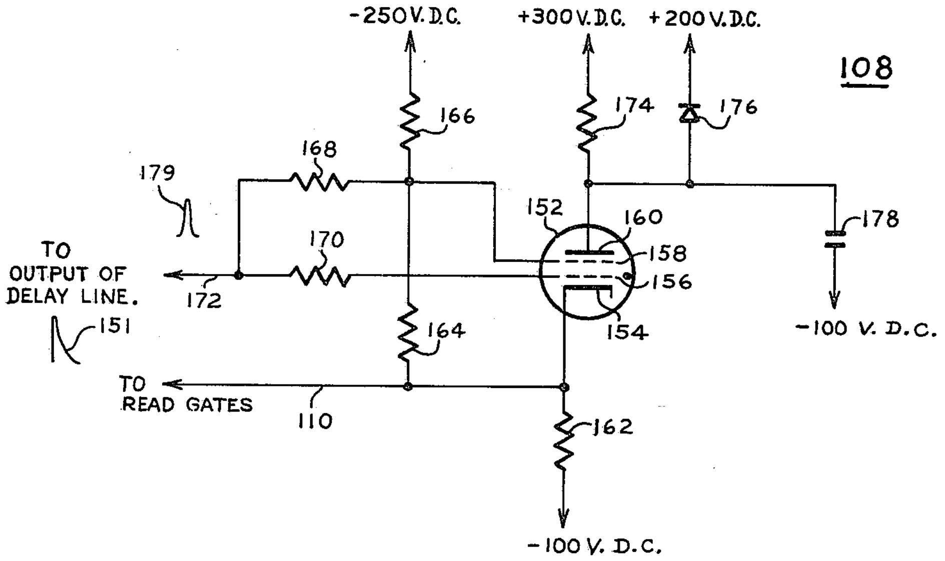
FIG. 5 is a schematic representation of a circuit comprising another portion of the system of FIG. 3.

A circuit suitable for use as the read gate control circuit 108 is shown in FIG. 5 and includes a thyratron tube 152 which has a cathode 154, a control grid 156, a shield grid 158, and an anode 160. The cathode is coupled both through a resistor 162 to a negative D.C. supply voltage of about 100 volts and by lead 110 to the shield grids of the read gate thyratrons 100, 102, 104 and 106. The cathode 154 is also coupled through series-connected resistors 164 and 166 to a negative D.C. supply voltage of about 250 volts. The shield grid 158 is connected to the junction point of the two resistors 164 and 166. The shield grid 158 and control grid 156 are coupled through resistors 168 and 170, respectively, to a common lead 172 which is suitably coupled to the output portion 86 of the delay line 82. The anode 160 of the thyratron 152 is connected through a resistor 174 to a positive D.C. supply voltage of about 300 volts. The anode is also connected through a diode clamp 176 to a positive D.C. supply voltage of about 200 volts and through a capacitor 178 to a negative D.C. supply voltage of about 100 volts.

The read gate control circuit 108 operates at the output end of the delay line as follows. A first timing pulse is applied to the input of the delay line from the blocking oscillator, and then each of the bits of the binary signal is applied at predetermined spaced intervals corresponding to the spacing between the taps on the delay line. The pulses are timed so that the first timing pulse reaches the read gate control circuit 108 as the binary bits reach their respective taps. The timing pulse 179 (FIG. 5) is a positive pulse of about 250 volts which is applied to the two grids 156 and 158 of the thyratron which is thus caused to fire. The resultant output pulse 151 taken from the cathode 154 is a sharply peaked pulse having a time duration of about 1 microsecond.

Alternatively, the gate control circuit may be operated as follows. Two positive timing pulses may be fed into the delay line, both before and after the binary bits, as brackets therefor, and, when both timing pulses are in the delay line, all of the binary bits are at their proper positions in the delay line. The two positive timing pulses would be applied to the control and shield grids 156 and 158 of the thyratron 152 to turn the thyratron on and to carry out the operation as described above.

Figure 6:
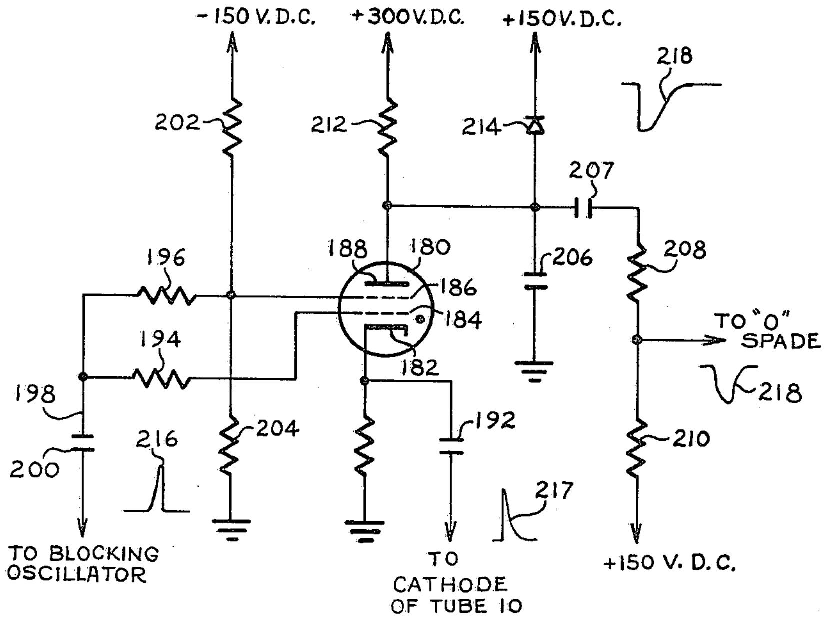
FIG. 6 is a schematic representation of a circuit comprising still another portion of the system of FIG. 3.

One suitable clear and zero-set pulse generator circuit 120 is shown in FIG. 6 and includes a thyratron 180 having a cathode 182, control grid 184, shield grid 186, and anode 188. The cathode 182 is connected through a bias resistor 190 to ground, and it is also coupled through a capacitor 192 to the cathode 14 of the tube 10. The control grid and shield grid are connected through resistors 194 and 196, respectively, to a common lead 198 which is coupled through a capacitor 200 to the output portion of the blocking oscillator. The shield grid is also coupled through a first resistor 202 to a negative D.C. supply voltage of about 150 volts and through a second resistor 204 to ground. The anode is coupled through a capacitor 206 to ground and to a differentiating network comprising, in series, a capacitor 207 and resistors 208 and 210. The resistor 210 is coupled to a positive D.C. supply voltage of about 150 volts and the junction point of the resistors 208 and 210 is coupled to the "0" spade of the switching tube 10. The anode 188 is also coupled through a quenching resistor 212 to a positive supply voltage of about 300 volts and through a clamping diode 214 to a positive supply voltage of about 150 volts.

In operation of the clear and zero-set circuit, a positive pulse 216 from the blocking oscillator is coupled to the control and shield grids 184 and 186, the pulse 216 having an amplitude of about 150 volts. The thyratron 180 is thus caused to fire and the resultant current flow provides a sharply peaked positive clear pulse 217 of about 150 volts at the cathode output lead, and a negative pulse 218 having a maximum amplitude of about 150 volts as shown is produced at the anode. The pulse 218 is differentiated by the differentiating network to provide a negative pulse 220, the zero-set pulse, of about 90 volts having its peak occur later in time than the peak of the clear pulse 217. Thus, the proper sequence of first clearing the tube 10 and then zero-setting the electron beam is achieved.

As described above, in order to insure the switching of an electron beam to the most leading position when more than two binary bits are applied to the tube 10, it is desirable that the 1-bit and 4-bit pulses have longer time durations than the 2-bit pulses. Suitable shortening of the time durations of the 2-bit pulses may be achieved by means of differentiating networks provided in the anode circuits of the thyratrons in the gate circuits 102 and 104. One suitable differentiating circuit is shown in dash lines in FIG. 4 and includes a connection 219 from the first output lead 134 through a capacitor 220 to a second output lead 221. The second output lead 221 is also coupled through a resistor 222 to a positive D.C. supply voltage of about 150 volts. When this differentiating circuit is employed, the first output lead 134 is coupled to the AND gate 119 (FIG. 3) and the second output lead in each case is coupled to the appropriate spade electrode of the tube 10.

It is clear that both the system of FIG. 3 and the various circuits shown in FIGS. 4, 5, and 6 are not the only systems and circuits which may be employed in practicing the invention as described broadly with respect to FIG. 2.

Figure 7:
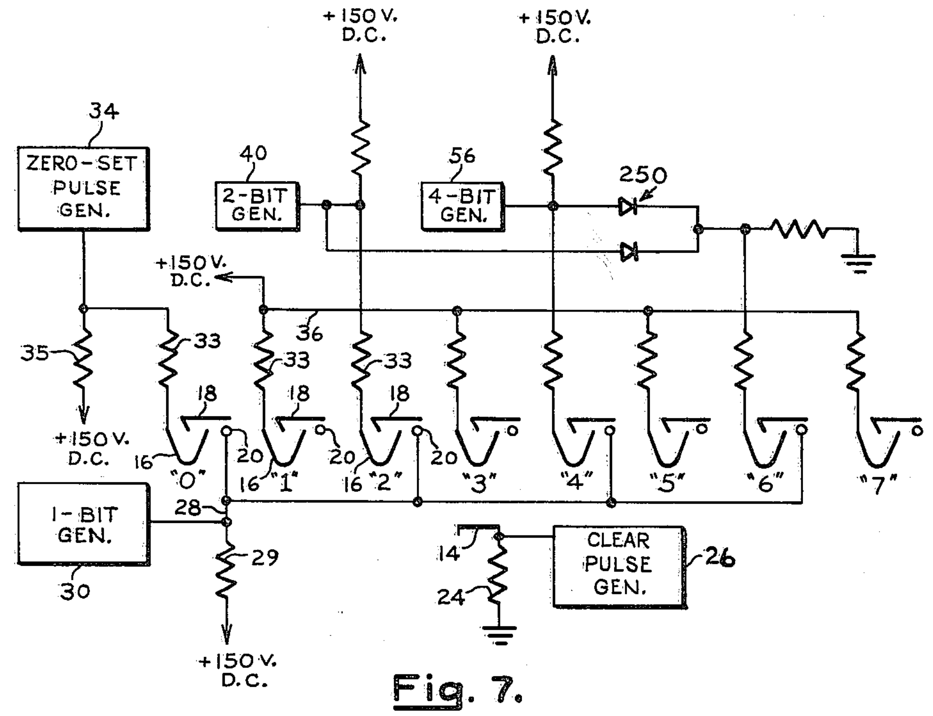
FIG. 7 is a schematic representation of a modification of the tube of FIG. 1 and a modified conversion circuit in which it may be employed.

The circuit of FIG. 2 may be modified for use in translating a 4–2–1 binary signal into the octal code. Such a circuit is shown in FIG. 7 and utilizes the tube 10. However, in this case, only eight positions numbered "0" to "7" are employed. In the circuit of FIG. 7, where tube and circuit elements are employed which are the same as in FIG. 2, these elements carry the same reference numerals as in FIG. 2. For purposes of simplicity, the connections to the target electrodes are omitted. The connections to the "0" spade are the same in the circuit of FIG. 7 as they are in FIG. 2. The odd-numbered spades are connected to the spade bus 36 and to the positive D.C. voltage supply of about 150 volts. The "2" spade is connected to the 2-bit pulse generator 40, and, in this case, the "4" spade is connected to the 4-bit pulse generator 56. The 2-bit and 4-bit generators are connected through a two-part AND gate to the "6" spade.

The circuit of FIG. 7 operates in substantially the same way as the circuit of FIG. 2. A zero representation in octal code occurs when no binary bits are applied to the tube 10. A conversion from binary code to a representation of number one in the octal code is achieved by the application of a 1-bit pulse to the even-numbered spades, an operation which causes the electron beam in the tube 10 to switch from the "0" position to the "1" position. A two representation is achieved by the application of the 2-bit pulse to the "2" spade. A three representation is achieved by the application of both the 2-bit and 1-bit pulses. A four representation is achieved by the application of a 4-bit signal to the "4" spade. A five representation results from the application of the 4-bit and 1-bit pulses. A six representation results from the application of 4-bit and 2-bit pulses through a two-part AND gate 250 to the "6" spade. A seven representation is achieved by applying the 4-bit, 2-bit, and 1-bit pulses to their proper electrodes. In this last operation, the 2-bit pulse should have a shorter time duration than the other pulses.

Figure 8:
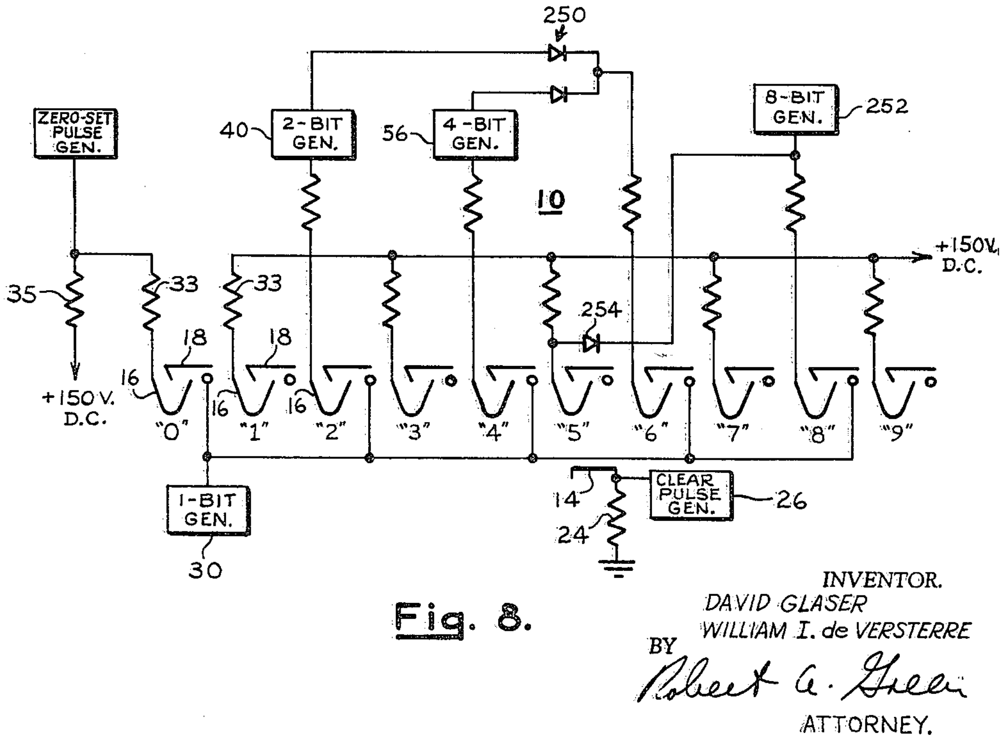
FIG. 8 is a schematic representation of the tube of FIG. 1 and another modification of a conversion circuit in which it may be employed.

Another circuit embodying the principles of the invention for translating 8–4–2–1 binary-coded decimal signals into signals in the decimal system is shown in FIG. 8. This circuit employs the tube 10 and all of its ten positions. The circuit and tube elements and connections which are the same in FIG. 8 as they are in FIG. 2 carry the same reference numbers in each figure. In FIG. 8, the 2-bit pulse generator 40 is coupled to the "2" spade, and the 4-bit pulse generator 56 is coupled to the "4" spade. The 2-bit and 4-bit generators are coupled through the two-part diode AND gate 250 to the "6" spade. An 8-bit pulse generator 252 is coupled to the "8" spade, and a diode 254 is provided with its anode connected to the "5" spade and its cathode connected to the 8-bit pulse generator 252.

In operation of the circuit of FIG. 8, when it is desired to represent a zero in the decimal system, the tube is cleared and reset at the "0" position as described above and no binary bits are applied to the tube 10. To achieve a conversion to a decimal one, the 1-bit pulse is applied to the even-numbered switching electrodes, and an electron beam is switched from the "0" position to the "1" position in tube 10. To convert to a decimal two, the 2-bit pulse is applied to the "2" spade, and this causes an electron beam to form at the "2" position. A decimal three conversion is obtained by applying both the 2-bit pulse to the "2" spade and the 1-bit pulse to the even-numbered switching electrodes. This causes an electron beam to form on the "2" spade and then to switch quickly to the "3" spade and the "3" position. A conversion to decimal four is obtained by applying the 4-bit pulse to the "4" spade and thus forming a beam in the "4" position. A decimal five conversion is obtained by applying both the 4-bit and 1-bit pulses to their appropriate electrodes to cause an electron beam to form at the "4" position and then to switch quickly to the "5" position.

A conversion to decimal six is obtained by applying both the 2-bit and 4-bit pulses to operate the AND gate 250 and lower the "6" spade so that a beam forms in the "6" position. A conversion to decimal seven is obtained by applying the 2-bit, 4-bit, and 1-bit pulses to the tube 10 so that an electron beam tends to form at the "6" position and then switches quickly to the "7" position under the influence of the even-numbered grids. A decimal eight is obtained by applying the 8-bit pulse to the "8" spade. This also applies the 8-bit pulse to the "5" spade. Thus, the beam switches from the "0" position to the "5" position and then to the "8" position. A decimal nine is achieved by forming a beam at the "8" position as described immediately above and then switching it to the "9" position by means of the 1-bit pulse applied to the even-numbered switching electrodes.

The circuits shown in FIGS. 2, 7, and 8 may be considered decoder modules and, if desired, in each conversion system, a plurality of modules may be coupled together. With such a coupling of decoder modules, a plurality of multi-element binary numbers may be converted to a multi-element octal or decimal number or the like.

The invention thus provides comparatively simple high speed binary decoders which have memory means, and thus are able both to decode a signal and to store the decoded signal. With respect to speed of operation, the decoders of the invention are capable of decoding multi-bit binary signals or words at a 500 kilocycle rate with the bits being processed simultaneously or in parallel.

What is claimed is:

1. A binary decoder comprising a multi-position electron tube including a cathode and a plurality of groups of electrodes;
  each of said groups comprising a position at which an electron beam may form;
  said positions being numbered arbitrarily zero, one, two, three . . . "*n*";
  each of said groups of electrodes including a target electrode adapted to receive an electron beam and to provide an output signal therefrom,
  a spade electrode adapted to form and hold an electron beam on its associated target electrode,
  and a switching electrode adapted for switching an electron beam from one group of electrodes to the next;
  all of said switching electrodes being connected in two sets with the odd-numbered electrodes being connected in one set and the even-numbered electrodes being connected in the other set;
  a plurality of signal sources each providing one signal bit,
  said bits being adapted to be arranged in different combinations,
  each combination of bits representing a binary word;
  said signal sources being coupled, one to the set of even-numbered switching electrodes, one to the spade electrode at the two position, one to the spade electrode at the four position, and one to the spade electrode at the six position;
  the last-mentioned two signal sources also being coupled through a signal mixing circuit to the spade electrode at the eight position,
  said signal bits being adapted to be applied simultaneously to said tube whereby an electron beam may be switched from zero position to another position determined by the combination of said signal bits,
  each different combination of signal bits causing an an electron beam to switch to a different position in the tube,
  each position in the tube providing an output signal in one code corresponding to the combination of applied signal bits in another code.

2. The decoder defined in claim 1 wherein the signals from the first and last-mentioned signal sources have longer time durations than the other signals.

3. A binary decoder comprising a multi-position electron tube including a cathode and a plurality of groups of electrodes;
  each of said groups comprising a position at which an electron beam may form;
  said positions being numbered arbitrarily zero, one, two, three . . . "*n*";
  each of said groups of electrodes including a target electrode adapted to receive an electron beam and to provide an output signal therefrom,
  a spade electrode adapted to form and hold an electron beam on its associated target electrode,
  and a switching electrode adapted for switching an electron beam from one group of electrodes to the next;
  all of said switching electrodes being connected in two sets with the odd-numbered electrodes being connected in one set and the even-numbered electrodes being connected in the other set;

a plurality of signal sources each providing one signal bit,
said bits being adapted to be arranged in different combinations,
each combination of bits representing a binary word;
said signal sources being coupled, one to the set of even-numbered switching electrodes, one to the spade electrode at the two position, and one to the spade electrode at the four position;
the last-mentioned two signal sources also being coupled through a signal mixing circuit to the spade electrode at the six position,
said signal bits being adapted to be applied simultaneously to said tube whereby an electron beam may be switched from zero position to another position determined by the combination of said signal bits,
each different combination of signal bits causing an electron beam to switch to a different position in the tube,
each position in the tube providing an output signal in one code corresponding to the combination of applied signal bits in another code.

4. A binary decoder comprising a multi-position electron tube including a cathode and a plurality of groups of electrodes;
each of said groups comprising a position at which an electron beam may form;
said positions being numbered arbitrarily zero, one, two, three . . . "$n$";
each of said groups of electrodes including a target electrode adapted to receive an electron beam and to provide an output signal therefrom,
a spade electrode adapted to form and hold an electron beam on its associated target electrode,
and a switching electrode adapted for switching an electron beam from one group of electrodes to the next;
all of said switching electrodes being connected in two sets with the odd-numbered electrodes being connected in one set and the even-numbered electrodes being connected in the other set;
a plurality of signal sources each providing one signal bit,
said bits being adapted to be arranged in different combinations,
each combination of bits representing a binary word;
said signal sources being coupled, one to the set of even-numbered switching electrodes, one to the spade electrode at the two position, one to the spade electrode at the four position, and one to the spade electrode at the eight position;
the second and third-mentioned signal sources also being coupled through a signal mixing circuit to the spade electrode at the six position;
and a diode having its anode coupled to the spade electrode at the five position and its cathode coupled to the last-mentioned signal source,
said signal bits being adapted to be applied simultaneously to said tube whereby an electron beam may be switched from a "0" position to another position determined by the combination of said signal bits,
each different combination of signal bits causing an electron beam to switch to a different position in the tube,
each position in the tube providing an output signal in one code corresponding to the combination of applied signal bits in binary code.

5. The circuit defined in claim 4 wherein said signal bits are in the 1–2–4–8 binary code and the source of the 1-bit is coupled to all of the switching electrodes at the even-numbered positions in said tube, and the sources of the 2, 4, and 8-bits are coupled to different spade electrodes at successively more leading positions in the tube.

6. The circuit defined in claim 4 wherein said signal bits are in the 1–2–4–8 binary code and the source of the 1-bit is coupled to all of the switching electrodes at the even-numbered positions in said tube, and the sources of the 2, 4, and 8-bits are coupled to different spade electrodes,
said 2-bit and 4-bit sources also being coupled together to a spade electrode in said tube.

7. The circuit defined in claim 4 wherein said signal bits are in the 1–2–4–8 binary code and the source of the 1-bit is coupled to all of the switching electrodes at the even-numbered positions in said tube, and the sources of the 2, 4, and 8-bits are coupled to spade electrodes at the "2," "4," and "8" positions, respectively,
said 2-bit and 4-bit sources also being coupled together to the spade electrode at the "6" position.

8. The circuit defined in claim 4 wherein said signal bits are in the 1–2–2–4 binary code and the source of the 1-bit is coupled to all of the switching electrodes at the even-numbered positions in said tube, and the sources of the 2, 2, and 4-bits are coupled to the spade electrodes at the "2," "4," and "6" positions, respectively, the 2-bit and 2-bit sources also being coupled together to the spade electrode at the "8" position.

9. A circuit for converting an electrical signal from one code system to another code system including an electron discharge device,
said electron discharge device comprising a magnetron beam switching tube including an electron-emitting cathode, a plurality of groups of electrodes surrounding said cathode, and means providing crossed electric and magnetic fields in said tube, said crossed electric and magnetic fields assisting, during tube operation, in the switching of an electron beam from one tube position to another in a direction determined by the orientation of the electric and magnetic fields.
a plurality of groups of electrodes arranged in a series in said device and occupying positions numbered from zero to "$n$" with each position and group of electrodes being either odd or even-numbered in the series, each group of electrodes comprising a position which is adapted to receive an electron beam and provide an output signal therefrom,
each group of electrodes including first electrode means for causing an electron beam to flow to itself and second electrode means for causing an electron beam to switch from itself to the next adjacent position in the series,
first input signal means coupled to said second electrode means in selected even-numbered groups of electrodes whereby a signal from said first signal means can cause an electron beam to switch from one of the selected even-numbered positions to the next adjacent odd-numbered position in the series,
second input signal means coupled to said first electrode means in said selected even-numbered groups of electrodes whereby an electron beam can be directed to each of said selected even-numbered groups of electrodes,
all of said input signal means being operable to apply signals simultaneously but in different combinations to said device,
each combination of signals having a meaning in a first code system and when applied to said device, each combination of signals causing an electron beam to switch from the zero position to a single specific group of electrodes from which an output signal then flows,
said output signal from said specific group of electrodes having a meaning in a second code corresponding to the meaning of the input signals in the first code.

10. The circuit defined in claim 9 wherein each group of electrodes includes a target electrode which receives an electron beam and provides an output signal therefrom, a spade electrode which forms an electron beam and holds it on its associated target electrode, and a switching electrode for switching an electron beam from one group of electrodes to another, and, in each group of electrodes, said first electrode means is the spade electrode and said second electrode means is the switching electrode.

11. The circuit defined in claim 9 and including auxiliary signal means coupled to said device for clearing an electron beam and resetting it at said zero position before signals from said input signal means are applied to said device to perform a signal conversion operation.

12. The circuit defined in claim 9 and including, reset signal means coupled to the group of electrodes at said zero position for setting an electron beam thereat, said second input signal means including a plurality of separate signal sources, said first and second input signal means being coupled to even-numbered groups of electrodes and two of said second input signal sources being coupled together to another even-numbered group of electrodes whereby said second input signal means can cause an electron beam to switch to the even-numbered positions in said device and said first input signal means can cause an electron beam to switch by one position from each even-numbered position to each odd-numbered position whereby an electron beam can be switched to any desired group of electrodes in said device by means of a particular combination of signals from all of said first and second input signal means.

13. The circuit defined in claim 9 wherein each of said groups of electrodes includes a target electrode for receiving an electron beam, a spade electrode for forming and holding an electron beam on its associated target electrode, and a switching electrode for switching an electron beam to the next adjacent group of electrodes, reset signal means coupled to the spade electrode of the group of electrodes at said zero position for setting an electron beam thereat, said first input signal means being coupled to the switching electrodes at said zero position and at the even-numbered positions, said second input signal means including a plurality of separate signal sources coupled to spade electrodes at said even-numbered positions whereby said second input signal means can cause an electron beam to switch to the even-numbered positions in said device and said first input signal means can cause an electron beam to switch by one position from each even-numbered position to each odd-numbered position whereby an electron beam can be switched to any desired group of electrodes in said device by means of a particular combination of signals from all of said first and second input signal means.

14. The circuit defined in claim 9 and including, reset signal means coupled to the group of electrodes at said zero position for setting an electron beam thereat, said first input signal means being coupled to each of said even-numbered positions, said second input signal means including a plurality of separate signal sources, two of said separate signal sources being coupled to the second and fourth groups of electrodes respectively, said two separate signal sources also being coupled together to the sixth group of electrodes whereby said separate signal sources can cause an electron beam to switch to the even-numbered positions up to the sixth in said device and said one signal means can cause an electron beam to switch by one position from each even-numbered position up to the sixth to each odd-numbered position up to the seventh.

15. The circuit defined in claim 9 and including a delay line with said first and second input signal means means being at different positions on said delay line, a gate coupled between each of said first and second signal means and the group of electrodes to which it is coupled, and master control means coupled to said gates for applying signals from said first and second signal means simultaneously to the groups of electrodes to which they are coupled.

References Cited in the file of this patent

UNITED STATES PATENTS

| | | |
|---|---|---|
| 2,721,955 | Fan et al. | Oct. 25, 1955 |
| 2,840,637 | McNaney | June 24, 1958 |
| 2,862,127 | Maynard | Nov. 25, 1958 |
| 2,881,418 | Stephens | Apr. 7, 1959 |